3,328,254
ALDOSTERONE IN THE TREATMENT OF PSORIASIS

Emil G. Conason, Brooklyn, and Otto Neracher, Mount Vernon, N.Y., assignors to West Laboratories, Inc., Long Island City, N.Y., a corporation of New York
No Drawing. Filed Sept. 20, 1962, Ser. No. 225,122
1 Claim. (Cl. 167—77)

Our invention relates to a pharmaceutical preparation which is in dosage unit form and which contains aldosterone. Our invention also relates to a method for the administration of aldosterone to human beings.

Aldosterone is a known material, the crystalline and hydrate forms thereof having being described in U.S. Patent No. 2,862,851 to Reichstein et al. That patent also describes a variety of pharmaceutical preparations which contain aldosterone. According to the teachings of the patent, when used the aldosterone is administered to the patient in the amount of from about 0.05 mg. to about 500 mg.

Aldosterone is a highly active steroid hormone. In accordance with our invention, we have discovered that aldosterone, when administered to a human patient in an excessive amount, in particular in dosages of 50 gamma (50 micrograms or 0.05 milligram) or higher, induces negative feed-back reactions which tend to nullify the reaction which it is desired to produce by the administration of the aldosterone. Furthermore, in accordance with our invention, we have discovered that the administration of small doses (i.e., within the range of from 5 to 35 micrograms, and preferably within the range from 10 to 30 micrograms) of aldosterone, is extremely valuable and useful in the treatment of psoriasis.

Hence, based upon our discovery of the unique utility of aldosterone when administered in small doses, our invention relates in part to pharmaceutical preparations in dosage unit form which contain from 5 to 35 micrograms of aldosterone and preferably from 10 to 30 micrograms of aldosterone. Also, based upon our discovery of the unique utility of aldosterone when administered in small doses, our invention furthermore relates to a method for the treatment of psoriasis. When employed in accordance with our invention, the aldosterone can be in either the hydrated or anhydrated form, and when the hydrated form is used the amount employed is based upon the amount of anhydrated aldosterone present in the hydrate.

The pharmaceutical preparations of our invention can take the form of parenteral preparations commonly used. Thus, they can be in the form of transmucosal tablets, sprays, and injectables. Also, the pharmaceutical preparations of our invention can be preparations from which absorption is prolonged. Thus, in the pharmaceutical preparations of our invention, the aldosterone can be in admixture with a pharmaceutical organic or inorganic solid or liquid carrier material. The preparations can contain pharmaceutical substances which are compatible with the aldosterone, for example, water, gelatin, lactose, starch, magnesium stearate, talc, vegetable oils, benzyl alcohol, gums, polyalkylene glycols, Vaseline, cholesterol, or other medicament carriers. The pharmaceutical preparations of our invention can also contain other therapeutically valuable substances.

The following examples illustrate various pharmaceutical mixtures which are in dosage unit form and which fall within the scope of our invention.

EXAMPLES

Example I.—Injectable

Aldosterone: (crystalline) 25 gamma
Neutral sesame oil free of peroxides, q.s., 1 ml.

Example II.—Injectable

|  | Milligrams |
|---|---|
| Aldosterone hydrate | 0.025 |
| Sodium carboxymethyl cellulose | 5.0 |
| Primary sodium phosphate | 2.0 |
| Secondary sodium phosphate | 1.0 |
| Mercury sodium thiosalicylate | 0.01 |
| Distilled water, q.s., 1.0 ml. | |

Example III.—Transmucosal tablet

|  | Milligrams |
|---|---|
| Crystalline aldosterone | 0.005 |
| Lactose | 75.0 |
| Sucrose | 85.0 |
| Stearin | 2.0 |
| Talc | 12.0 |
| Alpha amylase | 10.0 |
| Glycerin | 10.0 |

Example IV.—Injectable

| | |
|---|---|
| Crystalline aldosterone gamma | 15.0 |
| Adrenal cortical extract (containing 5 gamma aldosterone) ml | 1.0 |
| Ethyl alcohol ml | 0.05 |

Example V

For intravenous application once daily, the use of a mixture of aldosterone and calcium salts, e.g. calcium gluconate, enhances the activity of the aldosterone. A mixture of this type can be prepared by adding a solution of 25 micrograms of crystalline aldosterone dissolved in 1 cc. of ethyl alcohol to 10 cc. of an aqueous solution of calcium gluconate containing 1 gm. of calcium gluconate.

We claim:
A method for treating a human subject afflicted with psoriasis by administering daily to said subject about 5 to 35 micrograms of aldosterone until amelioration.

References Cited

UNITED STATES PATENTS 2,862,851   12/1958   Reichstein et al. _____ 167—77

OTHER REFERENCES

Cumulated Index Medicus:
(1) Vol. 1, Part II, Subject Index A–J, pp. S–75 to S–78 (1960).
(2) Vol. 2, Part II, Subject Index A–J, pp. S–90 to S–93 (1961).
Current List Of Medical Literature:
Vol. 34, p. S–21, entry 9170, December 1958.
Vol. 33, p. S–18, entry 32818, June 1958.
Vol. 32, p. S–18, entry 35109, December 1957.

ALBERT T. MEYERS, Primary Examiner.

SAM ROSEN, JULIAN S. LEVITT, FRANK CACCIAPAGLIA, JR., Examiners.

LEROY B. RANDALL, Assistant Examiner.